United States Patent
Weyand et al.

(10) Patent No.: US 7,752,220 B2
(45) Date of Patent: Jul. 6, 2010

(54) ALTERNATIVE SEARCH QUERY PROCESSING IN A TERM BIDDING SYSTEM

(75) Inventors: Tina Weyand, Los Angeles, CA (US); Rosie Jones, Pasadena, CA (US); Benjamin Rey, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 301 days.

(21) Appl. No.: 11/202,388

(22) Filed: Aug. 10, 2005

(65) Prior Publication Data
US 2007/0038602 A1 Feb. 15, 2007

(51) Int. Cl.
*G06F 17/30* (2006.01)

(52) U.S. Cl. .................... 707/767; 707/719

(58) Field of Classification Search ............. 707/1–10; 705/114
See application file for complete search history.

(56) References Cited

U.S. PATENT DOCUMENTS

| | | | | |
|---|---|---|---|---|
| 5,696,962 A * | 12/1997 | Kupiec | ............ | 707/4 |
| 5,966,126 A * | 10/1999 | Szabo | ............ | 715/762 |
| 6,704,727 B1 * | 3/2004 | Kravets | ............ | 707/999.005 |
| 6,876,997 B1 * | 4/2005 | Rorex et al. | ............ | 707/999.003 |
| 7,266,551 B2 * | 9/2007 | Kravets | ............ | 707/999.004 |
| 7,487,145 B1 * | 2/2009 | Gibbs et al. | ............ | 707/4 |
| 7,634,462 B2 * | 12/2009 | Weyand et al. | ............ | 707/999.003 |
| 2004/0220914 A1 * | 11/2004 | Cheung et al. | ............ | 707/3 |
| 2004/0260695 A1 * | 12/2004 | Brill | ............ | 707/5 |
| 2005/0027699 A1 * | 2/2005 | Awadallah et al. | ............ | 707/3 |
| 2005/0149504 A1 * | 7/2005 | Ratnaparkhi | ............ | 707/3 |
| 2005/0154717 A1 * | 7/2005 | Watson et al. | ............ | 707/3 |
| 2005/0154718 A1 * | 7/2005 | Payne et al. | ............ | 707/3 |
| 2005/0203883 A1 * | 9/2005 | Farrett | ............ | 707/3 |
| 2005/0240557 A1 * | 10/2005 | Rorex et al. | ............ | 707/1 |
| 2006/0161520 A1 * | 7/2006 | Brewer et al. | ............ | 707/3 |
| 2006/0253427 A1 * | 11/2006 | Wu et al. | ............ | 707/3 |
| 2006/0253437 A1 * | 11/2006 | Fain et al. | ............ | 707/5 |
| 2006/0259481 A1 * | 11/2006 | Handley | ............ | 707/5 |
| 2006/0282314 A1 * | 12/2006 | Zamanian et al. | ............ | 705/14 |

* cited by examiner

*Primary Examiner*—Don Wong
*Assistant Examiner*—Sheree N Brown
(74) *Attorney, Agent, or Firm*—Seth H. Ostrow, Esq.; Ostrow Kaufman & Frankl LLP

(57) ABSTRACT

A system and method for receiving a query and determining candidate alternate queries. A query may be parsed into concepts and then candidates for alternate terms may be determined for either the whole query or the determined concepts. Candidates are scored for their respective similarity to the original query. After scoring, at least one candidate is chosen and may be used as a possible alternate query choice for a user or used to serve bidded advertisements to the user.

12 Claims, 15 Drawing Sheets

| Keywords | Category | Monthly Search Volume | Your Max Bid ($) | Pos. | Top 5 Max Bids | Est. Clicks* | Est. CPC* | Est. Cost* |
|---|---|---|---|---|---|---|---|---|
| | | | Update Bids | | | | | |
| mp3 players | mp3 | 538,997 | 2.01 | 1 | 2.00 1.93 1.01 0.54 0.53 Bid Tool | 17,714 | 2.01 | 35,605.14 |
| portable mp3 players | mp3 | 240,254 | 2.01 | 1 | 2.00 0.48 0.48 0.39 0.38 Bid Tool | 10,425 | 2.01 | 20,954.25 |
| best mp3 player | mp3 | 36,877 | 1.01 | 1 | 1.00 0.74 0.41 0.40 0.39 Bid Tool | 433 | 1.01 | 437.33 |
| free mp3 players | mp3 | 5,833 | 0.28 | 1 | 0.27 0.26 0.25 0.17 0.15 Bid Tool | 535 | 0.28 | 149.80 |
| free mp3 player download | mp3 | 2,347 | 0.16 | 1 | 0.15 0.15 0.12 0.11 0.10 Bid Tool | 160 | 0.16 | 25.60 |
| | | | Update Bids | | | Estimated Monthly Cost: | | $57,172.12 |
| | | | | | | Estimated Daily Cost: | | $1,905.74 |

432 — original query:   discount   mazda mx6   body parts
618 — segmented query: discount | mazda mx6 | body parts
434 — new query:       cheap    | mx6       | body parts

700

ALTERNATIVE SEARCH QUERY PROCESSING IN A TERM BIDDING SYSTEM

This application is related to application Ser. No. 11/200,851 also filed Aug. 10, 2005 entitled "SYSTEM AND METHOD FOR DETERMINING ALTERNATE SEARCH QUERIES", the entirety of which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention relates generally to data processing systems and methods. More specifically, an embodiment of the invention relates to systems and methods for substitution of terms in search queries or advertiser listings.

BACKGROUND OF THE INVENTION

The World Wide Web is a distributed database comprising billions of data records accessible through the Internet. Search engines are commonly used to search the information available on computer networks, such as the World Wide Web, to enable users to locate data records of interest. A typical prior art search engine 100 is shown in FIG. 1. Web pages, hypertext documents, and other data records from a source 101, accessible via the Internet or other network, are collected by a crawler 102. Crawler 102 collects data records from source 101, using various methods and algorithms. For example, crawler 102 may follow hyperlinks in a collected hypertext document to collect other data records. The data records retrieved by crawler 102 are stored in a database 108. Thereafter, these data records are indexed by an indexer 104. Indexer 104 builds a searchable index of the documents in database 108. Common prior art methods for indexing may include inverted files, vector spaces, suffix structures, and hybrids thereof. For example, each web page may be broken down into words and respective locations of each word on the page. The pages are then indexed by the words and their respective locations. A primary index of the whole database 108 is then broken down into a plurality of sub-indices and each sub-index is sent to a search node in a search node cluster 106.

To use search engine 100, a user 112 typically enters one or more search terms or keywords, which are sent to a dispatcher 110. Dispatcher 110 compiles a list of search nodes in cluster 106 to execute the query and forwards the query to those selected search nodes. The search nodes in search node cluster 106 search respective parts of the primary index produced by indexer 104 and return sorted search results along with a document identifier and a score to dispatcher 110. Dispatcher 110 merges the received results to produce a final result set displayed to user 112 sorted by relevance scores. The relevance score is a function of the query itself and the type of document produced. Factors that affect the relevance score may include: a static relevance score for the document such as link cardinality and page quality, placement of the search terms in the document, such as titles, metadata, and document web address, document rank, such as a number of external data records referring to the document and the "level" of the data records, and document statistics such as query term frequency in the document, global term frequency, and term distances within the document. For example, Term Frequency Inverse Document Frequency (TFIDF) is a statistical technique that is suitable for evaluating how important a word is to a document. The importance increases proportionally to the number of times a word appears in the document but is offset by how common the word is in all of the documents in the collection.

Referring to FIG. 2, there is shown an example of a result set 120. As shown in the figure, in response to a query 122 for the search term "MP3 player" shown on the top of the figure, the search engine YAHOO! searched its web index and produced a plurality of results in the form of result set 120 displayed to a user. For brevity, only a first page of result set 120 is shown. Result set 120 includes ten results 124*a-f*, each with a respective clickable hyperlink 126*a-j*, description 127*a-j*, and Internet addresses or uniform resource locator (URL) 128*a-j* for data records that satisfy query 122.

In addition to displaying search results sorted by a relevance score, a search engine may display sponsored results 124*a-c* and 124*g-j*, which are pay-for-placement listings paid for by web page operators such as advertisers. An advertiser agrees to pay an amount of money to the search engine operator, commonly referred to as the bid amount, in exchange for a particular position in a set of search results that is generated in response to a user's input of a particular search term. A higher bid amount will result in a more prominent placement of the advertiser's website in a set of sponsored search results. Advertisers adjust their bids or bid amounts to control the position at which their search listings are presented in the sponsored search results. The pay-for-placement system places search listings having higher-value bids higher or closer to the top of the search listings. Higher-value bids may also be placed on a side bar, for example, as results 124*g-j* in FIG. 2. More prominent listings are seen by more users and are more likely to be clicked through, producing traffic of potential customers to the advertiser's web site.

Focusing on sponsored result 124*a*, each sponsor listing may include a clickable hyperlink title 126*a*, including anchor text "MP3 CD Walkman®," descriptive text 127*a*, and a uniform resource locator (URL), "sonystyle.com", 128*a*. Search engine 100 may store such sponsor listings, each associated with an advertiser or a web page operator, in database 108.

Search engine operators have developed various tools suitable for use in pay-for-placement systems to help the advertisers manage their bids and attract traffic. Referring to FIG. 3, there is shown an exemplary bidding tool 300. By way of example only, bidding tool 300 may include keywords 302, categories 304, monthly (or any other time period) search volumes 306 for each search term, maximum bids 308, positions 310, top 5 max bids 312, estimated monthly clicks 314, estimated monthly cost per click 316, and estimated monthly cost 318.

Keyword 302 is a search term, such as a word or a phrase, that relates to advertiser's business and describes its products or services. Category 304 defines a grouping of keywords that are similar in a particular way (e.g., product type). Monthly search volume 306 is a statistic indicating a number of monthly searches the advertiser can expect on a particular keyword based on historical data. Maximum bids 308 determine the maximum price the advertiser is willing to pay per click for a particular keyword. Positions 310 indicate the current position of the advertiser's listing in the search results based on the advertiser's max bid amount. Top 5 max bids 312 indicate the bid amounts for the top five bids on a particular keyword. Estimated monthly clicks 314 indicate the estimated number of total clicks the advertiser will receive from a keyword based on the advertiser's max bid. Estimated monthly CPC 316 indicates the advertiser's estimated average cost-per-click on a particular keyword based on the advertiser's max bid. Estimated monthly cost 318 indicates the advertiser's estimated total monthly cost on a particular keyword based on the estimated monthly clicks and estimated CPC.

Focusing on the search term "mp3 players" 302a, which belongs to category mp3 304a, an advertiser using a bidding tool 300 may observe that search term 302a has been searched for by YAHOO! users approximately 540,000 times in the preceding month, as indicated by the corresponding monthly search volume 306a. As further indicated by top five max bids 312a, top five maximum bid for search term 302a range from $0.53 to $2.00 per click. As further indicated by maximum bid 308, the advertiser must bid at least $2.01 for search term 302a to secure the most prominent placement of the advertiser's web site, among the sponsored search results. As further indicated by estimated clicks 314a, the most prominent placement position for search term 302a, may lead to approximately 17,714 clicks-through per month, with an associated monthly cost 318a for the advertiser of $35,605.14.

Thus, when a user performs a search on a pay-for-placement search engine, the sponsored results are conventionally sorted and displayed based on how much each advertiser has bid on the user's search term. Because different users will use different keywords to find the same information, it is important for an advertiser to bid on a wide variety of search terms in order to maximize the traffic to the advertiser's website. Thus, advertisers may attempt to place high bids on more than one search term to increase the likelihood that their websites will be seen as a result of a search for those terms. For example, the advertiser may decide to place bids on all search terms 302a-e shown in FIG. 3. The better and more extensive an advertiser's list of search terms, the more traffic the advertiser will see. However, there are many similar search terms for which the advertiser many not have bid. As a result, the advertiser can miss opportunities for advertising placement when these similar search terms are used, and the search engine operator may not receive any revenue from searches performed using such search terms for which there have been no bids.

Even in the context of non-sponsored searches, or search results that do not involve pay-for-placement listings, a search engine user is disadvantaged by the lack of intelligent searching of search terms that are similar to those typed into the search engine. This is because the search will produce limited results that do not necessary reflect the user's intent in searching. In some systems, there is some spell-checking that is performed on key words that are typed into the search engine. However, word searches on similar terms, or suggested searches using similar terms with respect to the typed keywords, are not provided in these systems.

Accordingly, there is a need for a system and method that would provide searches or suggested searches of search terms that are similar or related to search terms typed in by a search engine user.

There is also a need for a system and method for searching unbidded search terms in a sponsored search system that are similar or related to those typed in by a user.

SUMMARY OF THE INVENTION

One embodiment of the invention is a method for building a database of alternative search terms. The method comprises receiving from an advertiser a first bid for one or more first search terms, wherein the first bid represents an amount paid or to be paid in exchange for a particular position in a first set of search results generated in response to receiving from a user the one or more first search terms. The method further comprises receiving from the advertiser a second bid for one or more second search terms, wherein the second bid comprises an amount paid or to be paid in exchange for a particular position in a second set of search results generated in response to receiving from a user the one or more second search terms. The method further comprises relating the one or more first search terms and the one or more second search terms to provide that the one or more second search terms can be substituted as alternative search terms to the one or more first search terms when appearing in a search query; and storing the one or more first and second search terms in a database.

Another embodiment of the invention is a method for processing a search query in a document search engine, the search query comprising one or more first search terms for searching for documents, the search query being processed by a system configured to receive bids for search terms, the bids representing amounts paid or to be paid by a sponsor in exchange for a particular position in a set of search results generated in response to receiving from a user specific search terms in a query. The method comprises identifying candidate terms for alternative search terms to the one or more first search terms; and identifying bids associated with the candidate terms. The method further comprises scoring each of the candidate terms based at least in part on the bids associated with the candidate terms; and selecting, based on the scoring, one or more of the candidate terms to be alternative search terms.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 3 is a prior art table illustrating a bidding tool.

FIG. 7 is a table illustrating a process for producing an alternate query in accordance with an embodiment of the invention.

DETAILED DESCRIPTION OF THE PREFERRED EMBODIMENT(S)

Figure 1:
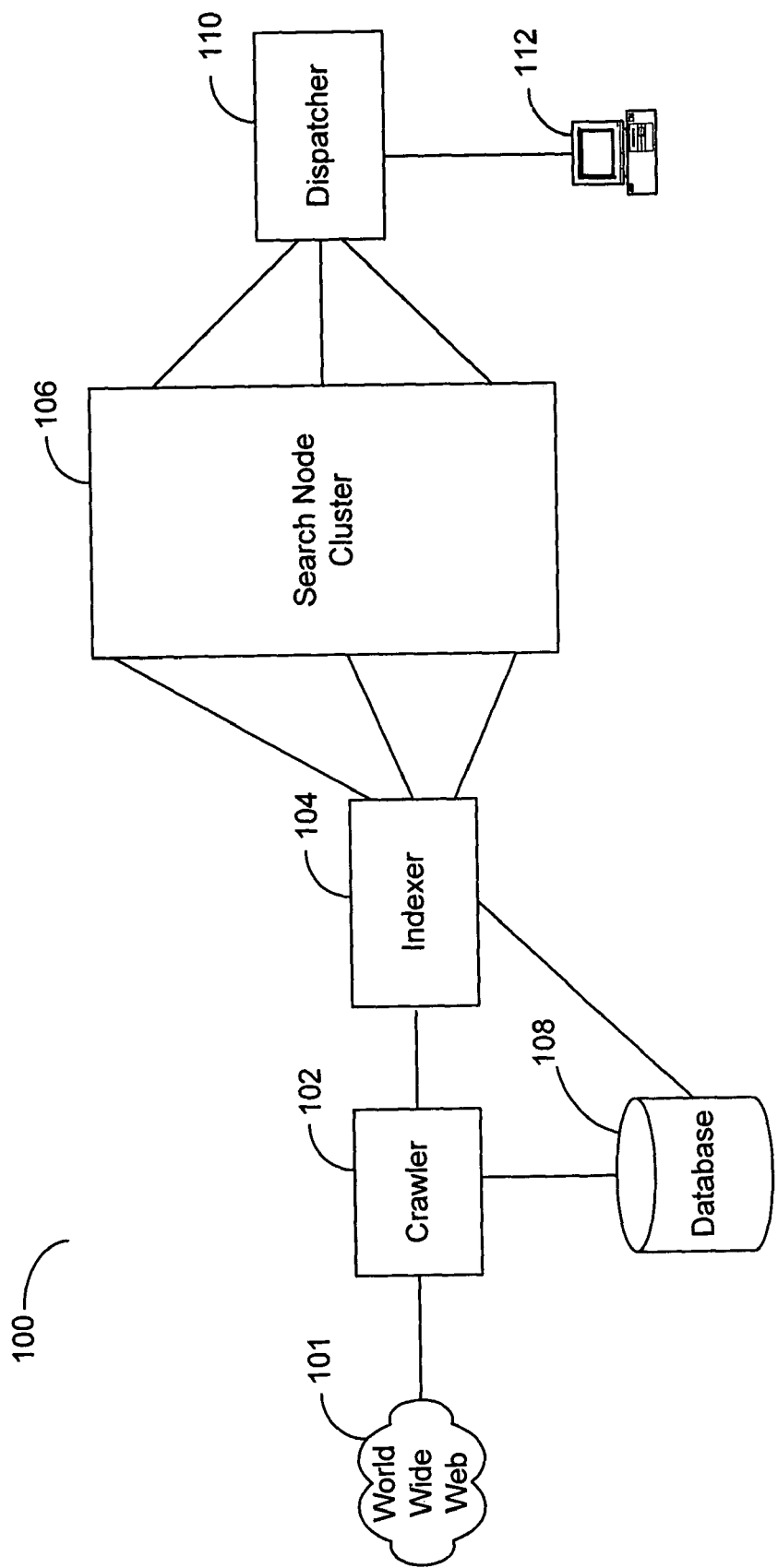
FIG. 1 is a prior art system diagram illustrating a search engine.
Figure 2:
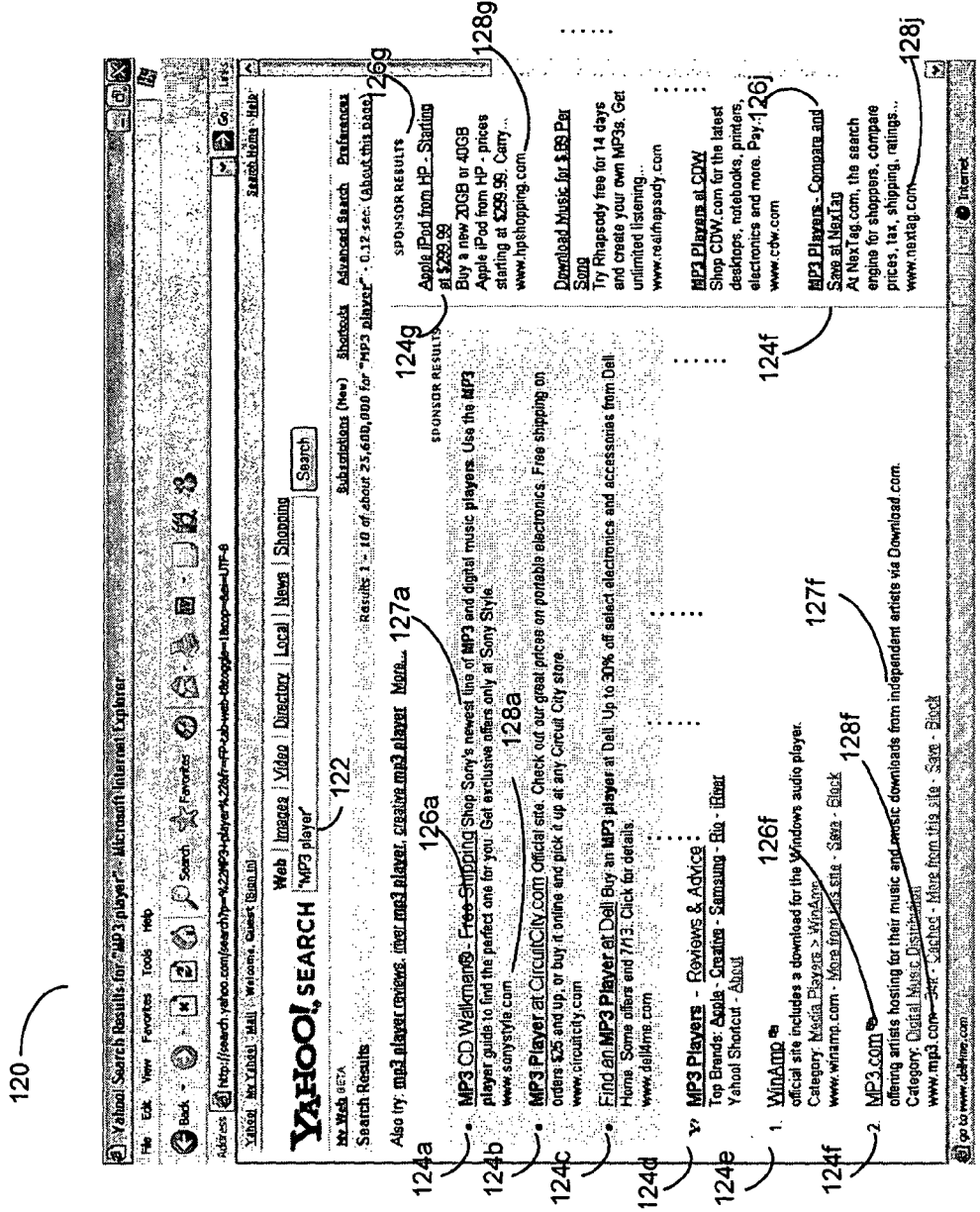
FIG. 2 is a prior art screen shot illustrating a result set from a search engine.
Figure 4:
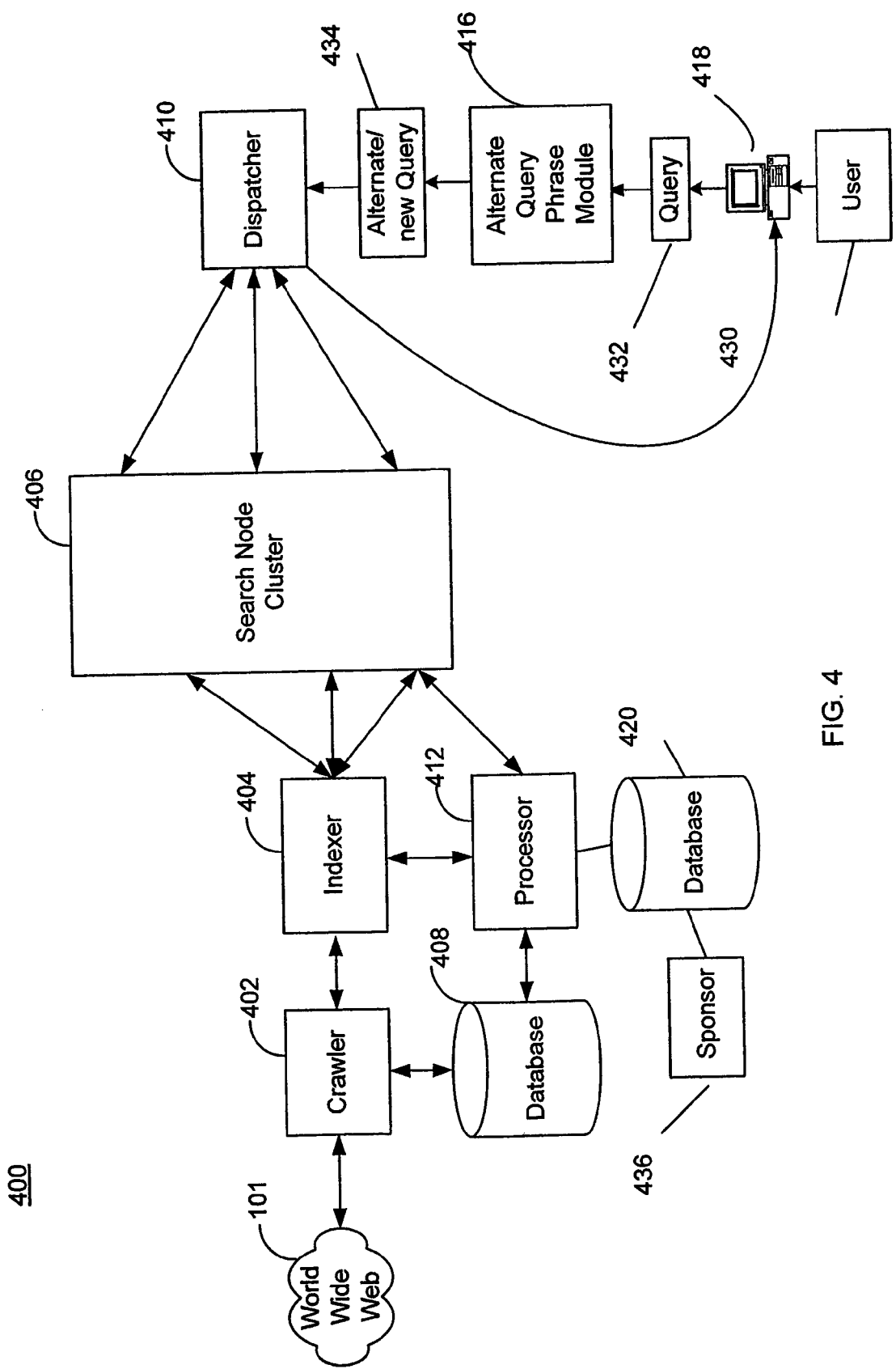
FIG. 4 is a system diagram illustrating a system in accordance with an embodiment of the invention.

Referring to FIG. 4, there is shown a system 400 in accordance with an embodiment of the invention. System 400 includes a processor 412 connected to an indexer 404, a search node cluster 406, and a database 408.

A crawler 402 collects data records from source 101 and stores the collected data records in database 408. Thereafter, these data records are indexed by indexer 404. Indexer 404 builds a searchable index of the data records in database 408. To use search engine 400, a user 430 typically enters a query 432 of one or more search terms or keywords, which are sent first to an alternate query phrase module 416 and then to a dispatcher 410. Dispatcher 410 compiles a list of search nodes in cluster 406 to execute the query and forwards the query to those selected search nodes. The search nodes in search node cluster 406 search respective parts of the primary index produced by indexer 404 and return sorted search results along with a document identifier and a score to dispatcher 410. Processor 412 may also search ad database 420 and produce related ads (not explicitly shown) which are also sent to user 430. Dispatcher 410 merges the received results to produce a final result set displayed to user 430 via user terminal 418 sorted by relevance scores. Original query 432 may be a term, word, phrase, keyword, or domain name—and each of the words "term", "word", "phrase", "keyword", and "domain name" are used interchangeably herein.

Figure 5:
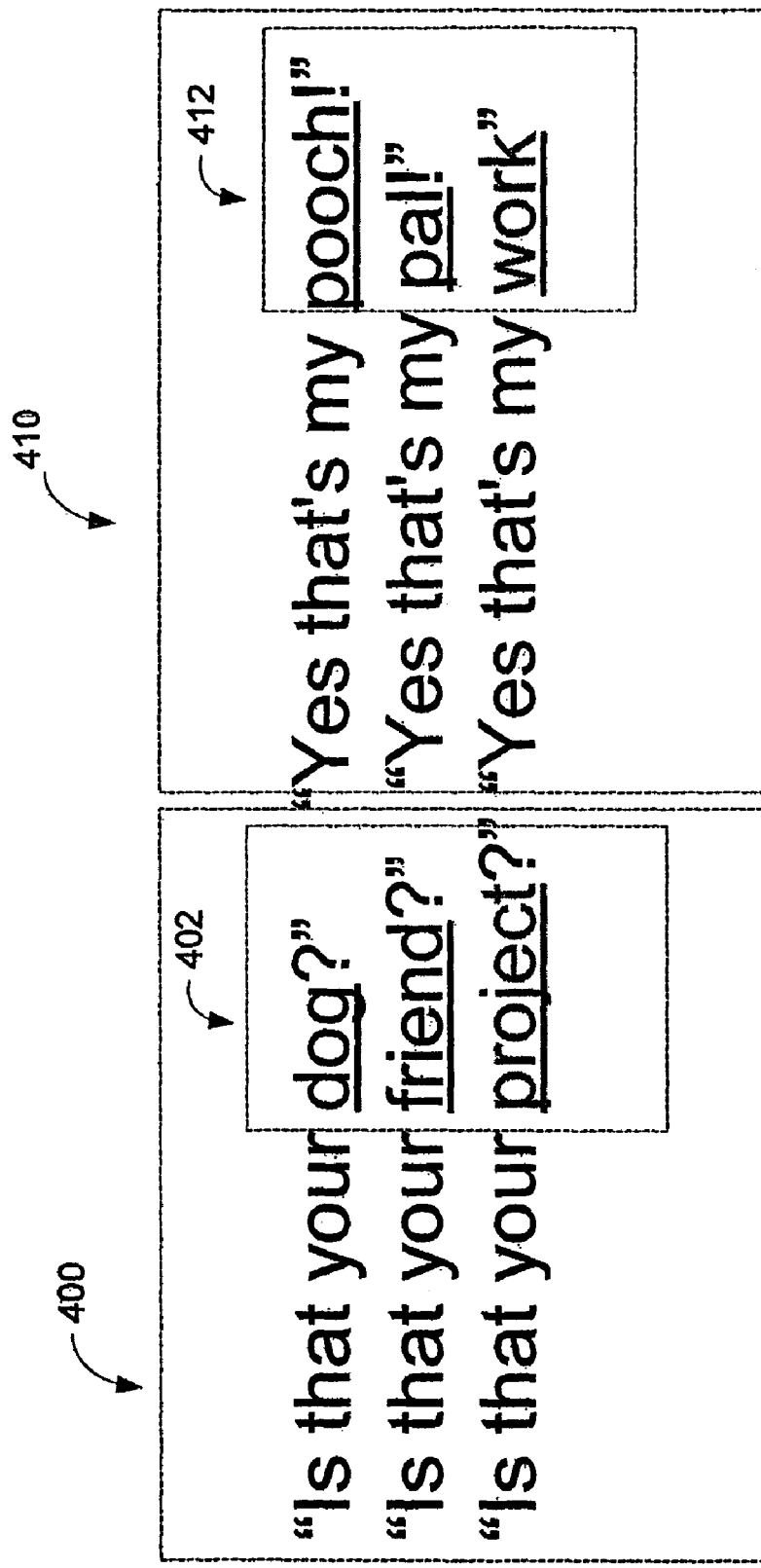
FIG. 5 is a prior art example illustrating human communication.

The inventors have recognized that humans are not consistent in the way they express themselves. FIG. 5 is a diagram illustrating several statements, and responses, that may occur in a normal human conversation. As shown, there are three questions 400 illustrated, and three responses 410, by two different people. Within those questions 400 and responses 410, there are direct subjects 402. As shown, although the meaning of each subject 412 in the response 410 is used to express the same thing as the subject 402 of the question 400, the words used are vastly different. It is human reasoning that deduces from the context that the subjects 402 and 410 refer to the same thing.

Figure 6:
FIG. 6 is a prior art example illustrating terms and possible substitutes.

However, such measuring is particularly burdensome with respect to creating software, in which, normally, exacting terms are necessary to provide commands to software. While human logic is able to easily deduce that the subjects 402 and 412 refer to the same thing, computers and electronic devices generally do not include such characteristically human like reasoning. For example, with reference to FIG. 6, in the field of word, or keyword, searching of documents, the problem is easily illustrated. In the example, a user types in "car insurance" for the terms 500 to be searched by the search engine. However, as illustrated, there are many other similar or related terms 510 that appear in, or are indexed for, documents or web pages being searched. These similar or related terms 510 may be commercial or non-commercial terms for commercial or non-commercial documents and pages. System 400 solves the above described problems.

Referring again to FIG. 4, alternate query phrase module 416 receives query 432 and produces at least one candidate alternate query 434 in response. Alternate query phrase module 416 may produce alternate query 434 using one or a combination of many methods. Referring now also to FIG. 7, an example is shown where alternate query phrase module 416 produces alternate query 434 for received query 432. In the example, received query 432 is "discount mazda mx6 body parts". Alternate query phrase module 416 first segments received query 432 into natural concepts as is illustrated using bars 616 to produce a segmented query 618. For each concept in segmented query 618, alternate query phrase module 416 looks for candidate alternate terms or phrases to yield alternate query 434.

In the example, the word "discount" is replaced with the candidate term "cheap". The term "MX6®" replaces the combination term, "Mazda® MX6®." Finally, after searching for alternatives for the term "body parts," alternate query phrase module 416 determines that there is not a better alternative, and therefore, "body parts" is not changed in alternate query 434. Although received query 432 is shown as being broken down into a plurality of concepts, alternate query phrase module 416 may also find candidate alternate terms for the entire query 432 at once.

Alternate query phrase module 416 may use other algorithms for determining candidates for alternate query 434. For example, alternate query phrase module 416 may input original query 432 into the Wordnet database. The Wordnet database includes commonly used terms and works effectively as a thesaurus. Alternate query phrase module 416 may also look at pairs of words and contexts within a set of documents—for example all documents indexed. For example, if the words "apple" and "banana" are both followed by the word "eat" in documents, alternate query phrase module 416 may determine that the words "apple" and "banana" are similar enough to one another and substitute one alternate as a candidate for the other. The similarity could be determined using, for example, a cosine measure. Similarly, a search may be made for each of the words in original query 432 in a set of documents (for example the top 50 documents) and then words which are proximate to the words in original query 432 may be used as replacements. Such a system is described in, for example, "SYSTEMS AND METHODS FOR INTERACTIVE SEARCH QUERY REFINEMENT", application Ser. No. 10/424,180, the entirety of which is hereby incorporated by reference. For example if original query 432 includes the word "fruit" and a document has the word "fruit" within M words of the word "banana" the words "fruit" and "banana" may be used as alternate candidates for one another.

Still another option is to run a search for original query 432, look at ads produced by the search, and then look at terms in the produced ads. Those terms from the produced ads may then be used as alternate query candidates.

Another option for alternate query phrase module 416 is to search for the top N results for original query 432 (for example N could be 10) in a search engine and then look for the most common words in these results. Those most common words may then be used as candidates for alternate query 434. Alternatively, original query 432 may be segmented into concepts as discussed above and then each concept may be searched in a search engine and the most common words in the results used as candidates for alternate query 434.

Alternate query phrase module 416 may use a hierarchy of selection criteria. For example, module 416 may select a synonym candidate over a hypernym candidate for replacement. The hierarchy is based on historical and statistical correlations.

Figure 8:
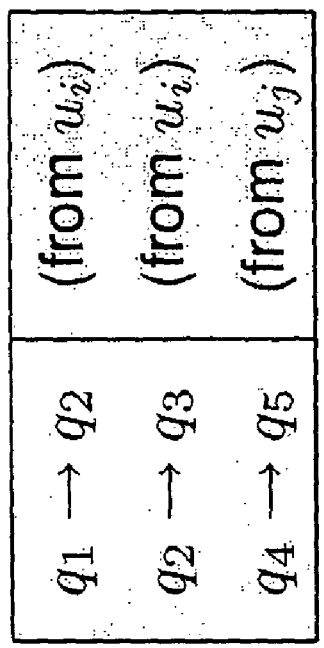
FIG. 8 is a table illustrating a process for producing an alternate query in accordance with an embodiment of the invention.

Alternate query phrase module 416 may also determine sets of queries which are requested by users within a time frame and use elements in such sets as candidates. Referring to FIG. 8, there is shown a table 700 which may be used to determine candidate alternate queries. As shown in FIG. 8, a first user designated with user ID "$u_i$," enters query q1 at a time t, a query q2 at time t+1, and a query q3 at a time t+2. For example, user $u_i$ may be entering a series of queries related to one topic. Similarly, a second user designated with user ID "$u_j$" enters a query q4 at time t and a query q5 at time t+1. Processor 412 uses this information and determines that term q1 is similar to q2, term q2 is similar to q3 and term q4 is similar to q5. Such relationships among query terms may be stored in, for example, database 420. Alternate query phrase module 416 may use such information from database 420 and produce candidate alternate query 434 using this information. Limitations may be placed on the length of time in between queries. For example, queries may be labeled as related if they are entered by the same user within 30 minutes of one another.

In another option, an algorithm is performed on a statistically large enough sample of documents to determine common occurrences of related terms. In this embodiment, the alternate phrase query module 416 analyzes the documents and determines which terms occur together more frequently in documents together. Also, the spatial arrangement of words within the documents may be analyzed. For example, if two words always occur within the same sentence together, more so than others, then a relationship may exist, and the terms added as candidate related terms.

In yet another option, the alternate phrase query module 416 collects terms from a sponsor file to provide candidate substituted query terms. Sponsors may select related terms to maximize their exposure. For example, a sponsor may bid on both of the terms "car" and "auto." The alternate phrase query module 416 will search through the sponsor file, and statistically recognize that a significant number of sponsors chose to bid on both "car" and "auto." These terms are added as candidate related terms for query substitution, which, in one embodiment, are stored in a database as further described below. In this regard, the alternative phrase query module 416 receives bids from advertisers for search terms and stores search terms bid on by the same advertisers in a database which reflects a relationship between two search terms that can be substituted as alternatives fro one another when they appear in a search query. In one embodiment, the storing only occurs if the first and second bids are received from one advertiser, or if they are received from that advertiser within a defined amount of time from one another.

In one embodiment, the candidate related terms are stored in a alternate search term database ("related terms database"). Each record in this related terms database includes fields that each contain terms. When the alternate query phrase module 416 first segments a typed-in query, combinations of terms within the query text are searched in the database in each of the fields. For example, if one segment contained the commercial term, "Mazda® MX6®" the system searches the database, and finds the term in one of the fields. The alternate query phrase module 416 determines that it should substitute the term "MX6®" for better search results, as the relationship between "Mazda®MX6®" and the term "MX6®" is indicated as alternates in the database record, in the form of a synonym. In the related terms database, the term "Mazda® MX6®" may appear multiple times. For example, in another record it may be stored as being related to the term "Mazda®"

as a hypernym. In one embodiment, when there are alternatives for replacing a segment, the alternate query phrase module 416 can use a hierarchy of selection criteria. In this example, the alternate query phrase module 416 may select the synonym over the hypernym for replacement. The hierarchy is based on historical and statistical correlations.

Once alternate query phrase module 416 determines a set of possible candidate queries 434 for original query 432, alternate query phrase module 416 then scores each candidate alternate query with respect to its relationship to original query 432. One scoring algorithm which could be used is the log likelihood ratio test. Basically, in this test, a likelihood is determined under two scenarios: 1) two events are independent or 2) two events are not independent. If the two events are independent, module 416 calculates the probability of event 2 occurring (such as query 2) as the relative frequency (a query rewritten as query 2)/total number of things rewritten. If two events are not independent, there are two probabilities—one for phrase 2 followed by phrase 1 which is determined by count(phrase 2 follows phrase 1)/count(phrase 1).

The other probability is for phrase 2 when the system did not see phrase 1 first—which is determined by count(phrase 2, when the system didn't see phrase 1)/count(everything except phrase 1).

The expression p(q1,q2) is the probability of seeing phrase 1 followed by phrase 2 which is determined by count(phrase 1 and phrase 2)/total number of pairs; and $p(q1)$=count($q1$)/total number of pairs and $p(q2)$ =count($q2$)/total number of pairs.

Other tests which could be used are the point-wise mutual information formula given by the equation $$\frac{p(q1, q2)}{p(q1)p(q1)}$$

or Fischer's exact test.

Machine learning formulas may be used based on editorial rankings. For example a set of candidate terms for an original query term may be shown to a human editor and the human editor may rank each candidate term and give that ranking to a machine learning algorithm. The algorithm, in turn, learns how to score candidate terms. For example, the algorithm may seek to solve the equation:

$f(q1,q2)=\alpha n+\beta i+\gamma e+\delta$ where n=the number of substitutions or terms replaced from original query 432 to the candidate query;
 i=percentage of intersecting words; and
 e=character edit distance.

Alternate query phrase module 416 also determines a confidence for each candidate term. This confidence is an objective score to ascertain how close a candidate alternate query 434 is to original query 432. The confidence score is also used in ranking candidate alternate queries 434. For instance, if a candidate term has a really high confidence and a high bid, alternate query phrase module 416 may have a preference for the candidate as opposed to an exact match phrase with a poor bid.

A confidence threshold may be used where a sponsor may agree to be charged for an alternate query term if the confidence score for that alternate term, with respect to the original query, is higher than a defined threshold. For example, advance or broad match (match performed by all key words typed in a search regardless of the order or proximity in the searched documents) preferably obtains an average precision of 65%, but an exact match preferably obtains a precision of 95%.

For a given query, alternate query phrase module 416 produces many candidate alternate queries 434. In order to rank these candidates, the alternate query phrase module 416 may initially use the score given by the following linear model:

$LMScore(q1,q2)=0.68043$ $+2.03712 \cdot editDist(q,MODS(q))$ $+0.73363 \cdot wordDist(q,MODS(q))$ $+0.3589 \cdot numSubst(q,MODS(q))$ Wherein q1 is the original query and q2 is a candidate query, editDist is the Levenshtein distance between an original query and a candidate, wordDist is a function defined by (number of words in common/total of the number of words in each phrase); and numSubst is a function defined by:
   0—for whole query substitution
   1—if the module substituted one phrase (leaving the rest intact)
   2—if the module substituted 2 phrases (leaving the rest intact)
   etc.
The resulting score ranges from 1 to 4.

Finally, module 416 may apply a sigmoid scaling formula to the output of the above to obtain a score.

Alternate query phrase module 416 may then further transform the linear model score obtained above into a probability value. The probability value represents the probability of a candidate being a close to original query 432 using the following formula:

$$P(MODS(q) \text{ is correct}) = \frac{1}{1 + \exp(1.51297 \cdot LMScore(q) - 4.29146)}$$

Figure 9:
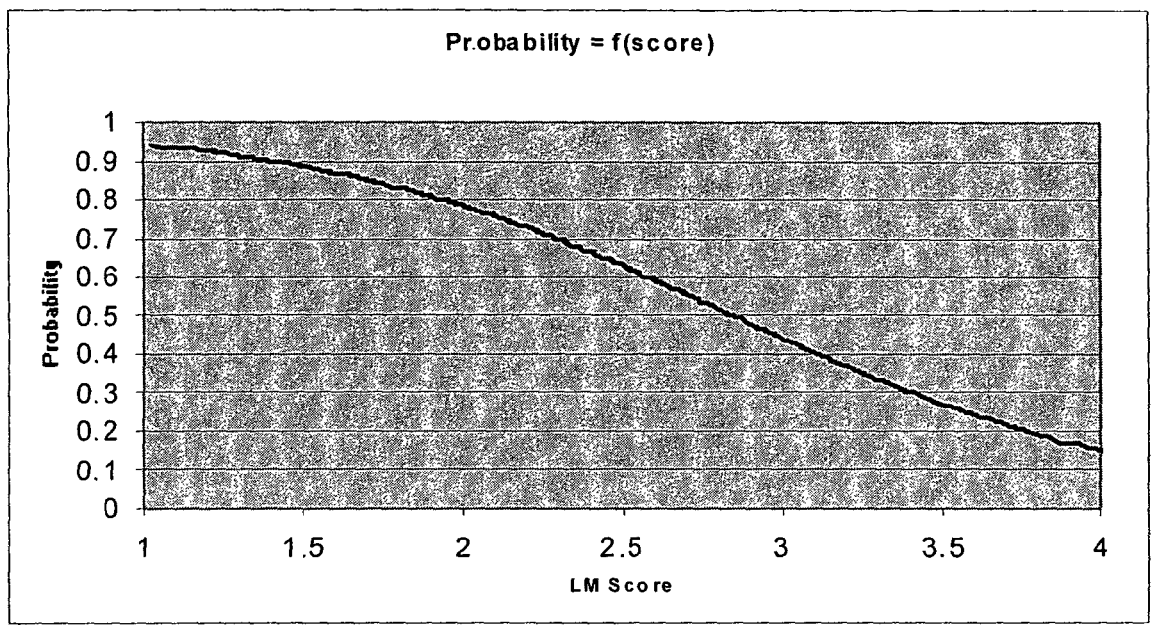
FIG. 9 is a graph illustrating outputs in accordance with an embodiment of the invention.

With reference to FIG. 9, a graph of the calculated probabilities is shown.

Alternate query phrase module 416 may use a probability threshold where every suggestion with a probability greater than this threshold is accepted as a possible candidate. The threshold can be selected based on the average precision for the threshold.

Figure 10:
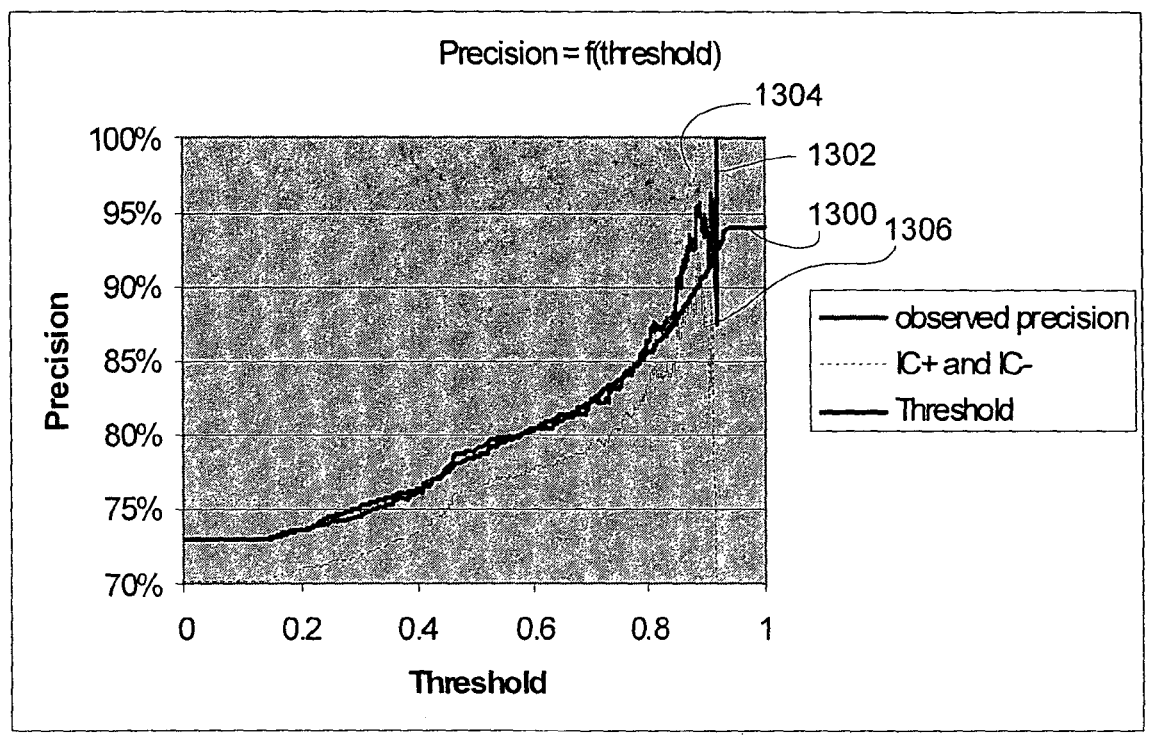
FIG. 10 is a graph illustrating outputs in accordance with an embodiment of the invention.

With reference to FIG. 10, a graph shows a plot of estimations of the precision 1302 of suggestions based on the threshold. Curve 1302 is the precision observed in tests carried out on sample data for a given threshold 1300, together with its confidence interval upper bound: IC+ 1304 and lower bound: IC− 1306.

Figure 11:
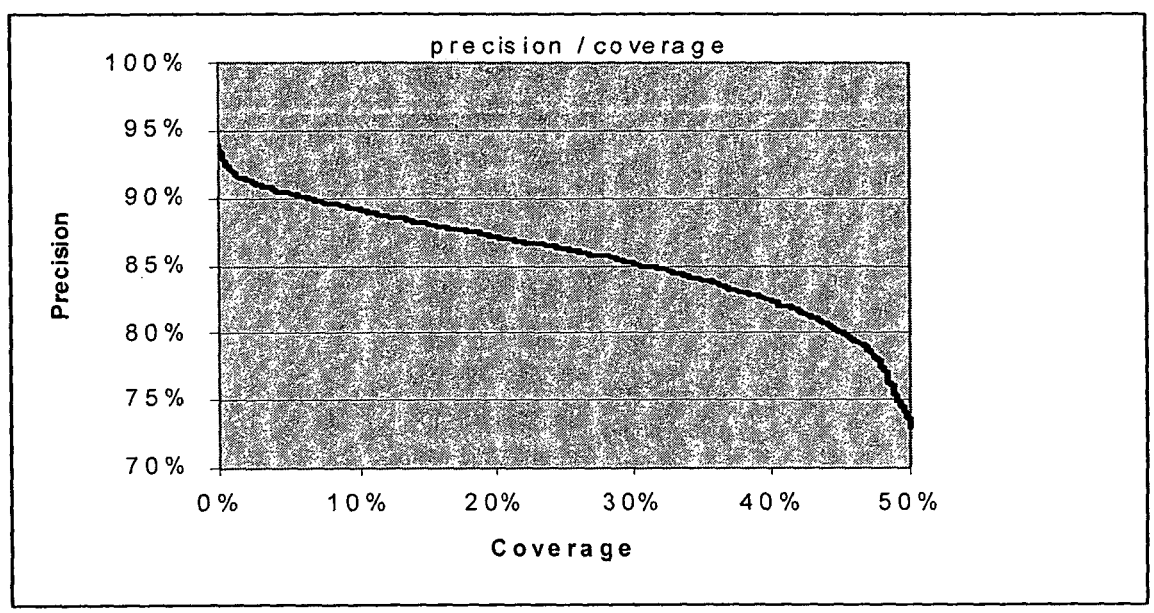
FIG. 11 is a graph illustrating outputs in accordance with an embodiment of the invention.

With reference to FIG. 11, the relationship of precision=f (coverage) is plotted. The graph in FIG. 11 illustrates how precision and coverage interact with the threshold.

Once at least one alternate query 434 is determined, alternate query phrase module 416 may use alternate query 434 in a variety of ways. Alternate query phrase module 416 may provide alternate query 434 as an option for user 430 in performing an additional search. Alternate query phrase module 416 may also use alternate query 434 to provide user 430 with additional advertisements.

Referring again to FIG. 4, sponsors 436 have the option of selecting several levels of substitution matching when they bid on a term. For example, a sponsor 436 may simply bid on a particular query term and if that term is entered as a search query and a user clicks on an ad for that sponsor, the sponsor will be charged. A sponsor may also chose to have their listing appear, and agree to be charged for a click-through, if the term that they bid on is substituted for an alternative term as may be determined by module 416.

For example, a user may be planning a birthday party and enter for query 432 "oscar the grouch birthday decorations". In response, system 400 segments original query 432 and determines that the concepts associated with "oscar the grouch birthday decorations" are:
   oscar the grouch party decoration
   oscar the grouch birthday supply
   oscar the grouch party supply
   sesame street birthday decoration
   sesame street party decoration
   sesame street birthday supply
   sesame street party supply Alternate query phrase module 416 determines candidates for alternate query 432. In this example, there were no exact matches for the entire query 432 "oscar the grouch birthday decorations". Table 1 shows the a list of candidate terms that were identified. As shown in the table, each of the candidate terms has been bid on by a sponsor and the maximum bid for each candidate term is shown.

TABLE 1

Example Matches From Related Term Database

| Listing | Related term | bidded term | max bid |
|---|---|---|---|
| 1 | oscar the grouch party decoration | oscar the grouch | 0.16 |
| 2 | oscar the grouch party decoration | oscar the grouch | 0.10 |
| 3 | oscar the grouch party decoration | oscar the grouch | 0.10 |
| 4 | oscar the grouch birthday supply | oscar the grouch | 0.16 |
| 5 | oscar the grouch birthday supply | oscar the grouch | 0.10 |
| 6 | oscar the grouch birthday supply | oscar the grouch | 0.10 |
| 7 | sesame street birthday decorations | sesame street birthday | 0.19 |
| 8 | sesame street birthday decorations | sesame street birthday | 0.10 |
| 9 | sesame street birthday decorations | sesame street decoration | 0.10 |
| 10 | sesame street birthday supply | sesame street birthday supply | 0.11 |
| 11 | sesame street birthday supply | sesame street birthday supply | 0.10 |
| 12 | sesame street birthday supply | sesame street birthday | 0.10 |
| 13 | sesame street party supply | sesame street party supply | 0.33 |
| 14 | sesame street party supply | sesame street party supply | 0.32 |
| 15 | sesame street party supply | sesame street party supply | 0.30 |
| 16 | sesame street party supply | sesame street party supply | 0.27 |
| 17 | sesame street party supply | sesame street party supply | 0.20 |
| 18 | sesame street party supply | sesame street party supply | 0.17 |
| 19 | sesame street party supply | sesame street party supply | 0.12 |
| 20 | sesame street party supply | sesame street party supply | 0.11 |
| 21 | sesame street | sesame street | 0.10 |

TABLE 1-continued

Example Matches From Related Term Database

| Listing | Related term | bidded term | max bid |
|---|---|---|---|
| 22 | party supply sesame street | party supply sesame street | 0.10 |
| 23 | party supply sesame street | party supply sesame street | 0.10 |
| 24 | party supply sesame street | party supply sesame street | 0.10 |
| 25 | party supply sesame street | party supply sesame street | 0.11 |
| 26 | party supply sesame street party decoration | party sesame street party decoration | 0.10 |
| 27 | sesame street party decoration | sesame street party | 0.33 |
| 28 | sesame street party decoration | sesame street party | 0.10 |
| 29 | sesame street party decoration | sesame street party | 0.10 |
| 30 | sesame street party decoration | sesame street decoration | 0.31 |

The scoring of an alternate candidate term with respect to original query 432 may be based, at least in part, on a bid associated with the candidate term. For example, candidate terms with higher bids may be given a higher score.

Figure 12:
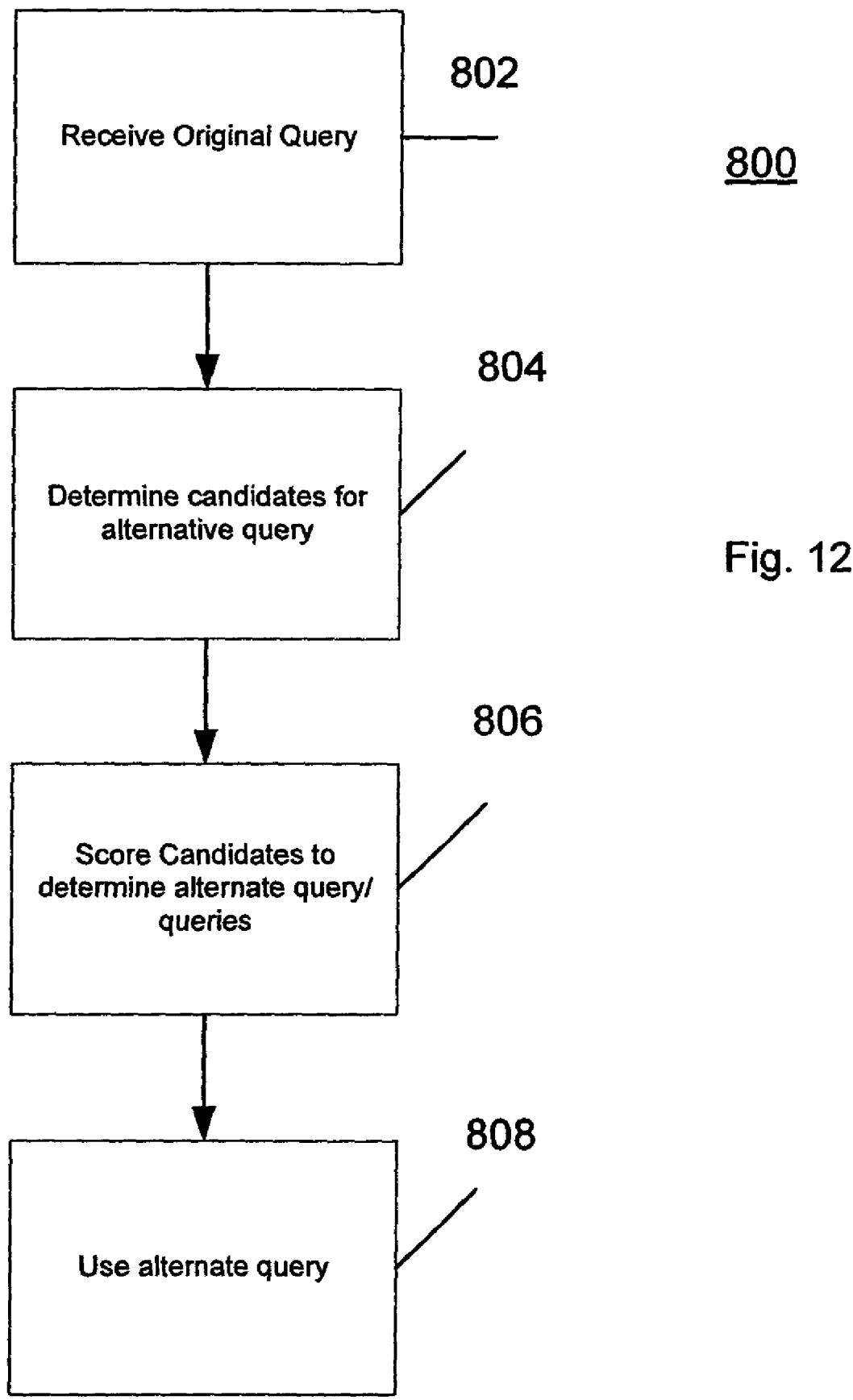
FIG. 12 is a flow chart illustrating a process in accordance with an embodiment of the invention.

Referring now to FIG. 12, there is shown a flow chart illustrating a process 800 which may be performed in accordance with an embodiment of the invention. Process 800 may be performed using, for example, system 400 though other systems may be used. At step 802, an original query is received. At step 804, candidates are determined for an alternate query. At step 806, the candidates are scored and an alternate query or queries are determined. At step 806 the alternate query is used.

Figure 13:
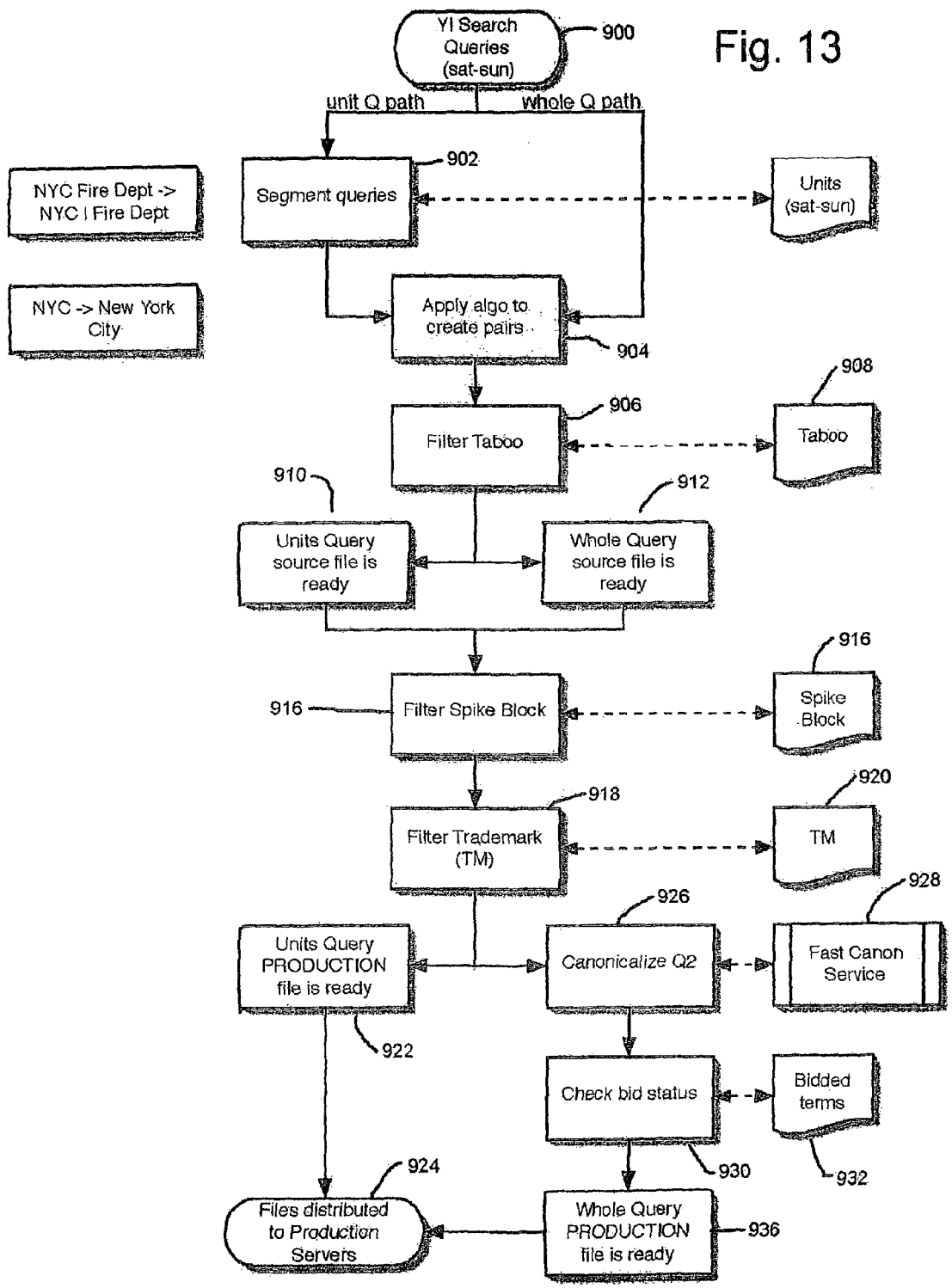
FIG. 13 is a flow chart illustrating a process in accordance with an embodiment of the invention.

With reference to FIG. 13, there is shown a more detailed flow chart illustrating a method in accordance with the invention. At step 900, a search query is received. At step 902, the query may be segmented into concepts as described above. For each segmented concept, an algorithm is used to determine alternate candidates. Of these candidates, taboo terms are filtered out of the system at step 906. Taboo terms are terms that are not desirable to keep in the system, such as derogatory or otherwise unwanted terms. A report on taboo terms is produced at step 908. A units query source file is prepared, step 910, and a whole query source file is prepared, step 912. The units query source file stores individual search terms, and the whole query search file stores entire queries to be matched.

Next, the process performs a spike filter, which means that for each pair of original query and candidate terms, the process checks to see if there is already a matching original and candidate pair at step 914. Such exact matches are reported at step 916. Next, a trademark filter is applied at step 918. In this step, if an original term or phrase in a query pair is in a list of terms that are subject to trademark protection, then the process filters out pairs which do not include the trademark term. Deleted pairs are reported, step 920.

At this point, the pairs are sent to storage in a database, such as database 408 step 924. The database may be stored on various servers for distributed processing.

Further, the query terms are checked for whether they are related to a sponsored term. The query terms are canonicalized step 926. The bid status for each term is checked against the sponsor listings, step 930, 932. At this point, the whole query is ready and it is sent to storage.

Figure 14:
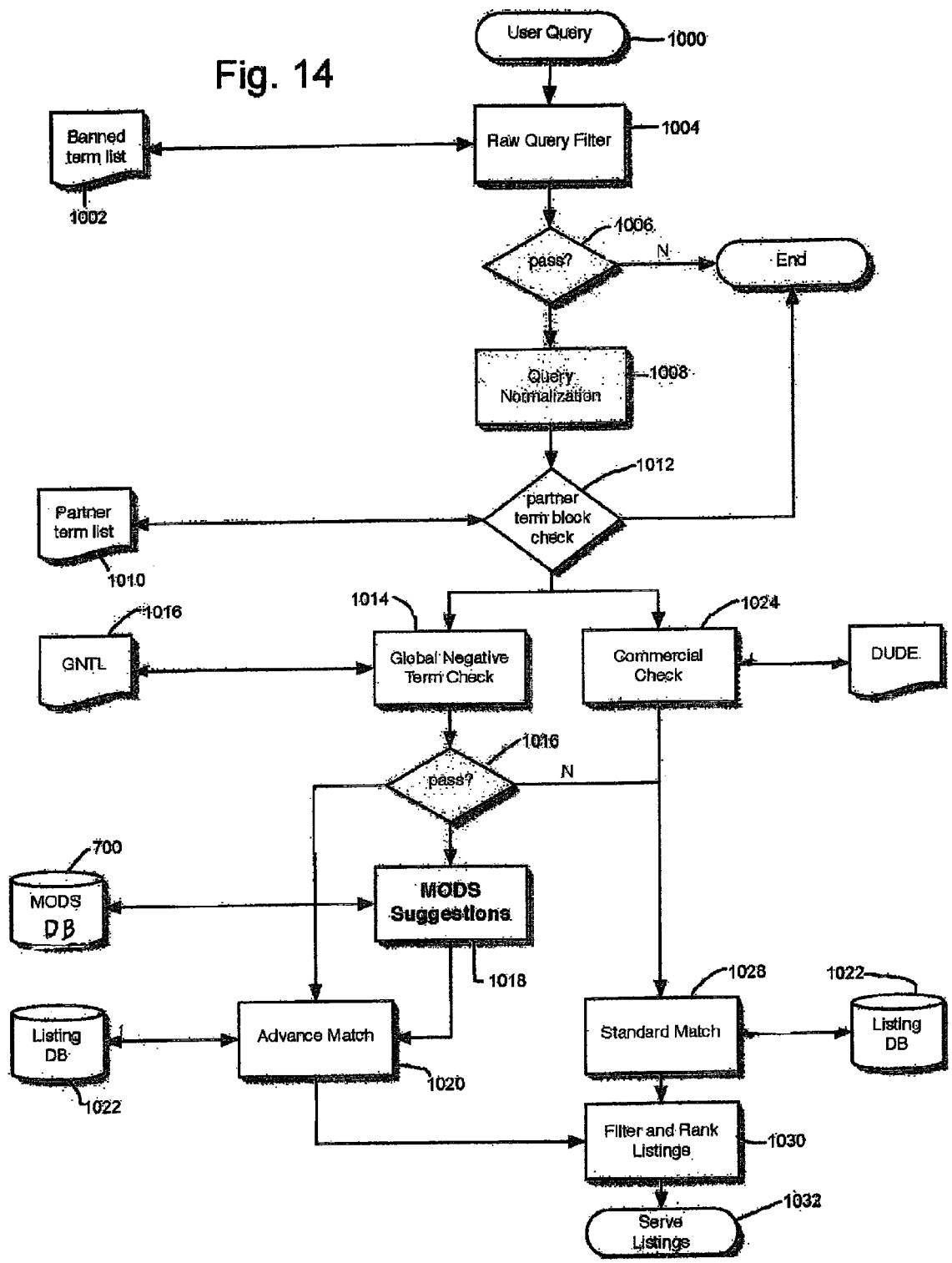
FIG. 14 is a flow chart illustrating a process in accordance with an embodiment of the invention.

With reference to FIG. 14, a flow chart illustrates a process performed by the invention when a user enters query search terms into a search engine, step 1000. A raw query filter reads from a banned term list 1002 to filter banned terms from the query, step 1004. If the query passes through the filter, step 1006, the query is normalized, step 1008. In the normalization step, the query is divided into segments. Next, the query is checked against a sponsor term list 1010, step 1012. A global negative term check is performed, step 1014, using a global negative term list 1016 to determine if the query includes banned or undesired terms. If the query passes the global negative term check, step 1016, then a database 700 is consulted for candidate alternative search queries as described above, step 1018. A search is then performed, step 1020, against the document listing database 1022.

With reference back to step 1012, after the partner term block check, the query is also forwarded to a commercial check, step 1024. As discussed above, some sponsors do not wish to pay for listing of their links due to searching of unbidded substitute terms. With respect to those sponsors, a standard search is performed to determine whether their listing should be included in the sponsored results, step 1028. All retrieved listings are filtered and ranked (scored), step 1030, and then served, step 1032.

Figure 15:
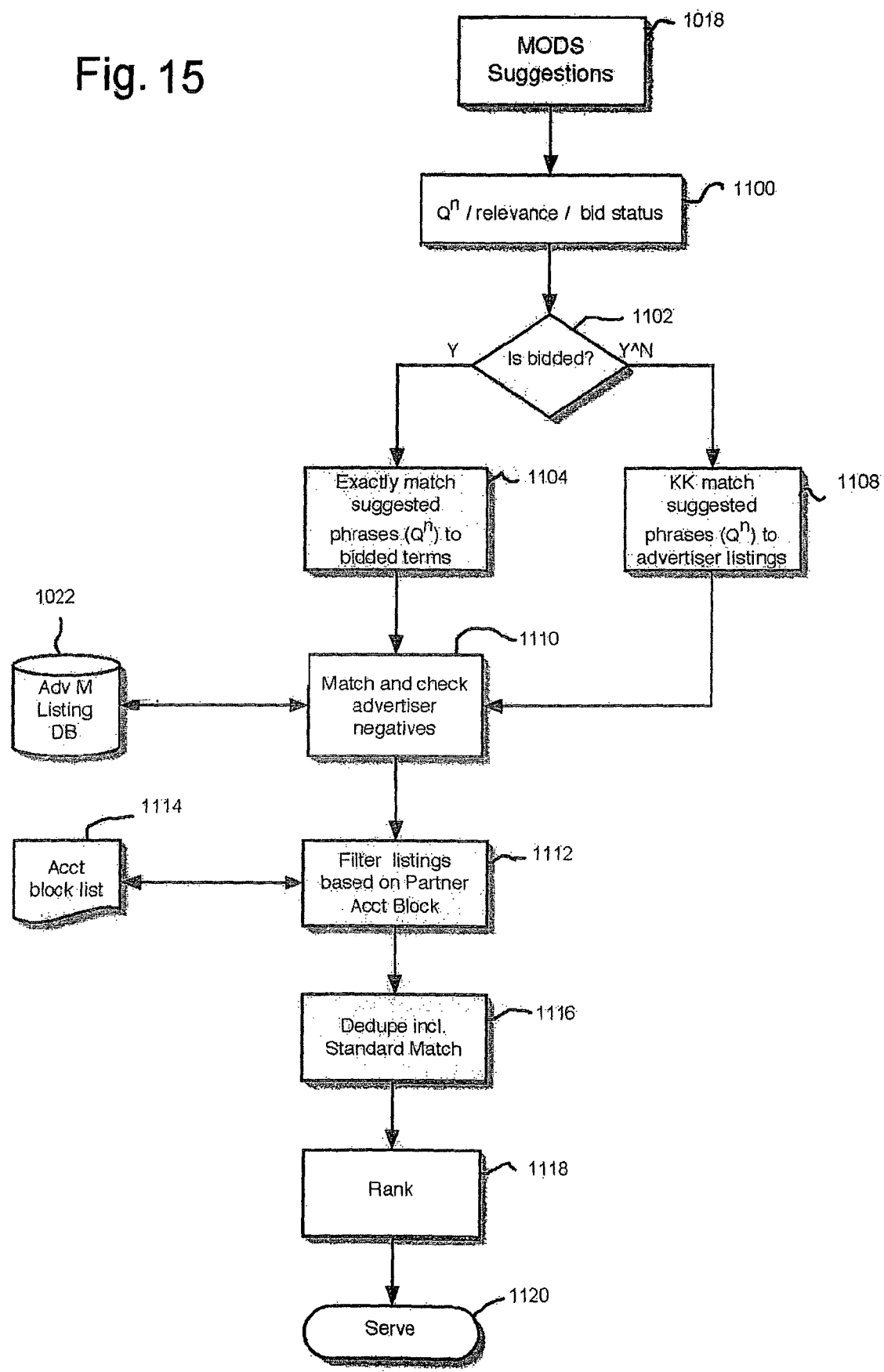
FIG. 15 is a flow chart illustrating a process in accordance with an embodiment of the invention.

With reference to FIG. 15, there is shown a flow chart illustrating the steps performed after step 1018 in FIG. 14 in further detail. The steps in FIG. 15 determine the bid status and relevance of the candidate terms ($Q''$), step 1100, the first step of which is determining whether any of the candidate terms have been bidded by a sponsor, step 1102. If the candidate terms, are bidded on, then an exact match is performed on the bidded terms at step 1102. Regardless of whether they are bidded, all of the terms $Q''$ are searched against the database of all advertisers 1022, step 1104. Next, the negative terms that are not to be searched are filtered out, step 1110. The listings are then filtered based on account blocking contracts put in place by search engine partners, step 1112. With regard to this step, some sponsors or partners may have arranged to have certain listings omitted from searches. Those listings are filtered from the search in step 1112. Duplicate listings removed from the match, step 1116, and the listing are ranked (scored), step 1118, before they are served.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for processing a search query in a document search engine, the search query comprising one or more first search terms for searching for documents, the search query being processed by a system configured to receive bids for search terms, the method comprising:

receiving the one or more first search terms on a search engine for execution by a dispatcher;

analyzing the one or more first search terms to identify candidate terms for alternative search terms to the one or more first search terms;

when there is two or more search terms, accessing an alternative query phrase module to further identify the candidate terms based one or more query phrases from the two or more search terms;

based on analyzing the one or more first search terms of the search query, identifying bids associated with the candidate terms of the search query;

scoring each of the candidate terms based at least in part on the bids associated with the candidate terms, the bids representing amounts paid or to be paid by a sponsor in exchange for a particular position in a set of search results generated in response to receiving, from a user, specific search terms in a query;

selecting, based on the scores, one or more of the candidate terms to be alternative search terms, the candidate terms being alternative terms for the search query; and performing, over a network, the search query for documents based on the alternative search terms as the search query terms.

2. The method of claim 1, wherein performing a search comprises searching an index.

3. The method of claim 1, comprising searching for advertisements associated with each of the candidate terms.

4. The method of claim 3, comprising selecting an advertisement associated with a candidate term for display to a user from whom the search query is received.

5. The method of claim 1, wherein selecting comprises selecting a candidate term to be an alternative search term if the candidate term has a bid associated therewith.

6. The method of claim 5, wherein selecting comprises selecting the candidate term to be an alternative search term if the score for the candidate term exceeds a defined threshold score.

7. The method of claim 6, comprising receiving the defined threshold score from the sponsor of the bid associated with the candidate term.

8. The method of claim 1, wherein scoring comprises increasing the score for a candidate term associated with a higher bid than the bid associated with another candidate term.

9. The method of claim 1, wherein scoring further comprises computing a probability score for each candidate alternative search term to define a probability that the candidate alternative search term will find documents intended to be found by the received search terms.

10. The method of claim 1, comprising ranking the alternative search terms based on the scores.

11. The method of claim 1, comprising determining whether the one or more search terms are associated with a bid.

12. The method of claim 11, wherein identifying candidate terms for alternative search terms is performed when the one or more search terms are not associated with a bid.

* * * * *